United States Patent [19]

Minucciani et al.

[11] Patent Number: 4,484,293
[45] Date of Patent: Nov. 20, 1984

[54] DIMENSIONAL MEASUREMENT SYSTEM SERVED BY A PLURALITY OF OPERATING ARMS AND CONTROLLED BY A COMPUTER SYSTEM

[75] Inventors: Giorgio Minucciani, Moncalieri; Maurizio Ercole, Turin, both of Italy

[73] Assignee: D.E.A. Digital Electronic Automation S.p.A., Moncalieri, Italy

[21] Appl. No.: 329,754

[22] Filed: Dec. 11, 1981

[30] Foreign Application Priority Data

May 15, 1981 [IT] Italy ............................... 67649 A/81

[51] Int. Cl.³ ............................................. G05B 19/42
[52] U.S. Cl. ..................................... 364/513; 364/560; 364/474; 318/568; 901/8; 901/44; 901/16
[58] Field of Search ....................... 364/513, 560, 474; 318/568; 414/589, 590, 730, 749, 750, 751; 901/8, 44

[56] References Cited

U.S. PATENT DOCUMENTS

| | | | |
|---|---|---|---|
| 3,654,616 | 4/1972 | Dunne et al. | 364/513 |
| 3,727,119 | 4/1973 | Stanley et al. | 318/568 |
| 3,890,552 | 6/1975 | Devol et al. | 318/568 |
| 4,152,767 | 5/1979 | Laliotis | 364/560 |
| 4,163,183 | 7/1979 | Engelberger et al. | 318/568 |
| 4,274,801 | 6/1981 | Herb et al. | 414/751 |
| 4,283,764 | 8/1981 | Crum et al. | 364/513 |
| 4,384,332 | 5/1983 | McMurtry | 364/474 |

Primary Examiner—Jerry Smith
Assistant Examiner—Allen MacDonald
Attorney, Agent, or Firm—Gifford, VanOphem, Sheridan, Sprinkle & Nabozny

[57] ABSTRACT

A dimensional measurement system comprises a plurality of operating arms simultaneously controlled and monitored by a computer system wherein each of the arms includes a support structure for a measurement end and includes orthoganally displaceable members enabling three dimensions of orthoganal movement of the measurement end. The displaceable members preferably comprise a first carriage slidably engaged with a support beam, a sliding beam slidably secured to the first carriage, a second carriage secured to the sliding beam, and a second sliding beam slidably secured to the second carriage, wherein the support for the measurement end is on the end of the second sliding beam. The beams preferably include racks engaged by motor driven gears to provide controlled displacement of the displaceable members. The computer system preferably simultaneously controls movement of the arms as well as delivery of workpieces to the arms.

5 Claims, 5 Drawing Figures

DIMENSIONAL MEASUREMENT SYSTEM SERVED BY A PLURALITY OF OPERATING ARMS AND CONTROLLED BY A COMPUTER SYSTEM

BACKGROUND OF THE INVENTION

The present invention relates to a dimensional measurement system served by a plurality of operating arms (robots) and controlled by a computer system.

As is known, in the field of dimensional measurements, particularly the measurement of mechanical workpieces in production, individual, substantially specialist machines have until now been used since a more complex system involved significant problems in obtaining measurement in real time, particularly in the case of application to a production line where such a requirement is of primary importance. Moreover, there are various disadvantages (cost, complexity of conversion etc.,) in a provision of a system which can be easily adapted to different types of production; differing, that is, as to the characteristics of the workpieces and as to the measurement operations.

SUMMARY OF THE INVENTION

The object of the present invention is to provide a dimensional measurement system controlled by a computer system, which will overcome the above mentioned limitations and which can be used in production lines and will be flexible, modular and adaptable so that it can be used in widely differing conditions.

According to the present invention there is provided a dimensional measurement system characterised by the fact that it comprises a plurality of operating arms controlled by a computer system, each of the said arms comprising a support structure for a measurement end, the said computer system providing simultaneous control and monitoring of the said plurality of arms.

BRIEF DESCRIPTION OF THE DRAWINGS

For a better understanding of the present invention one embodiment thereof will now be described by way of non limitative example with reference to the attached drawings, in which.

DETAILED DESCRIPTION OF THE INVENTION

Figure 1:
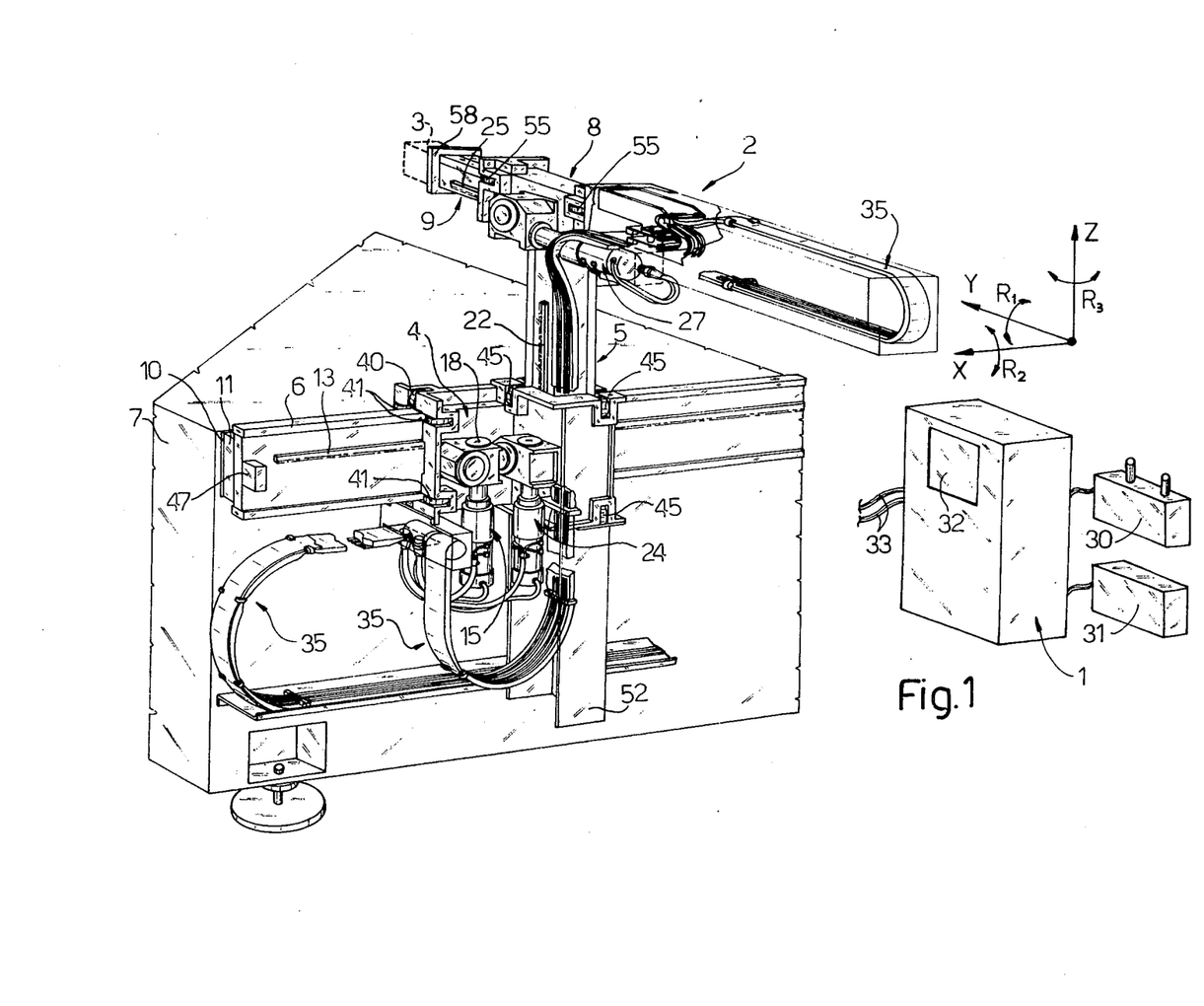
FIG. 1 is a perspective view of an individual arm used in the dimensional measurement system of the present invention.

With reference to FIG. 1 there is illustrated therein an arm 2 which carries an end 3. The arm structure 2 comprises a single carriage 4 supported by a single vertical column 5, and the carriage 4 is slidable along the axis of a support element 6 which is fixed laterally to a fixed work bed 7. At the top of the single column 5, which is slidable along its own axis, there is carried a carriage 8 which serves as a support and guide for a single horizontal column or beam 9 which carries the end head 3. By means of the carriages 4 and 8 this head 3 can be displaced along the directions x, y, z, of a set of three orthogonal cartesian axes respectively parallel to the axes of the support element 6, to the axis of the horizontal beam 9 and to the axis of the vertical column 5. On the structure 2, between the beam 9 and the head 3, there can be mounted three further rotary drive units (not illustrated) for turning the head 3 around three rotations indicated $R_1$, $R_2$ and $R_3$, respectively about the y, x and z axes, any two of which can conveniently be mounted simultaneously, to bring the arm 2 up to the maximum envisaged configuration of five axes (three linear and two rotary). The support element 6 is in the form of an I-section beam mounted vertically and is fixed to a plate 10 connected to the bed 7 by means of a spacer block 11.

On the side of the element 6 there is fixed a rack 13 with which meshes a pinion driven by the output of a motor unit 15 fixed to the body 4, for the movement of the carriage 4 along the element 6. The motor unit 15 comprises a d.c. motor with an incorporated tach generator. The motor shaft is connected to the pinion by means of a reduction gearbox 18 of the worm screw and worm wheel type. Detection of the position of the carriage 4 along the element 6 is effected by an incremental type optical "encoder" having known reference notches, and this is keyed directly onto the motor using the shaft passing therethrough both for drive and centering. The carriage 4 also constitutes a guide for the vertical column 5 along one side of which there is secured a rack 22 with which meshes a pinion of a motor unit 24 similar to the motor unit 15 and fixed to the carriage 4.

Along one side of the horizontal beam 9 there is fixed a rack 25 with which meshes a pinion of a motor unit 27 similar to the motor unit 15 and fixed to the carriage 8. The arm 2 is connected to a computer system 1 to which there is further connected a box 30 for the manual control of the movement of the head 3, and a video keyboard 31, and it carries a control panel 32. The computer 1 is connected to the arm 2 by means of connection cables 33 which are only partially illustrated. The electrical connection to the various motor units 15, 24 and 27 and to the other component elements of the arm are made using flat conductor strips 35 which are flexible in such a way as not to give rise to any tensions on the arm 2 thereby allowing a very high number of folds, and each of which includes a plurality of electrical conductors alongside one another which are supplied in alternate steps so that each can be insulated with respect to the other. The carriage 4 is conveniently made of cast aluminium and is integral with the part which guides the vertical column 5 along the z axis. This carriage 4 is disposed astride the element 6 and carries two pairs of support rollers 40 positioned with their axes horizontal above and below the element 6, and four pairs of guide rollers 41 arranged with their axes vertical on either side of the element 6 at the top and the bottom thereof.

The vertical column 5 which controls movement of the head 3 along the z axis passes through the carriage 4 which serves as a support and guide therefor. This column 5 is made of square section steel tube. The carriage 4 in fact carries at the top and bottom thereof two sets of four rollers 45 disposed perpendicularly with respect to the surfaces of the column 5 and in pairs adjacent the opposite corners of column 5. Within the column 5 there is located a single acting balancing cylinder (of known type not illustrated) for avoiding the creation of excessively high disturbing couples on the motor unit 24. This cylinder has a shaft fixed at the top to the interior of the column 5 while the body is connected to the interior of a channel 52 fixed to the underside of the carriage 4. Also within the column 5 there are housed the cables and tubing for the movements along the y axis and for subsequent components of the arm 2. The carriage 8, which is fixed to the top of the column 5 serves as a support and guide for the horizontal column 9 which moves along the y axis. The carriage 8 is also made of cast aluminium and the column 5 is also made of square section steel tube. The carriage 8 also carries at the top and bottom, adjacent the opposite corners of the column 5, two sets of four rollers 55 disposed perpendicularly with respect to the surfaces of the column 5 itself. A standardized flange 58 is provided at the end of the beam 9 for mounting (in a manner not illustrated) convenient measurement elements and for possible sensors for detecting forces along the y and z axes, and for drive units for controlling one or more of the rotations $R_1$, $R_2$ and $R_3$.

The arm 2 will not be described in more detail since it forms the subject of the invention described in Italian Patent Application No. 67647-A/81 of the same Applicant the contents of which are incorporated herein by reference as far as necessary.

Figure 2:
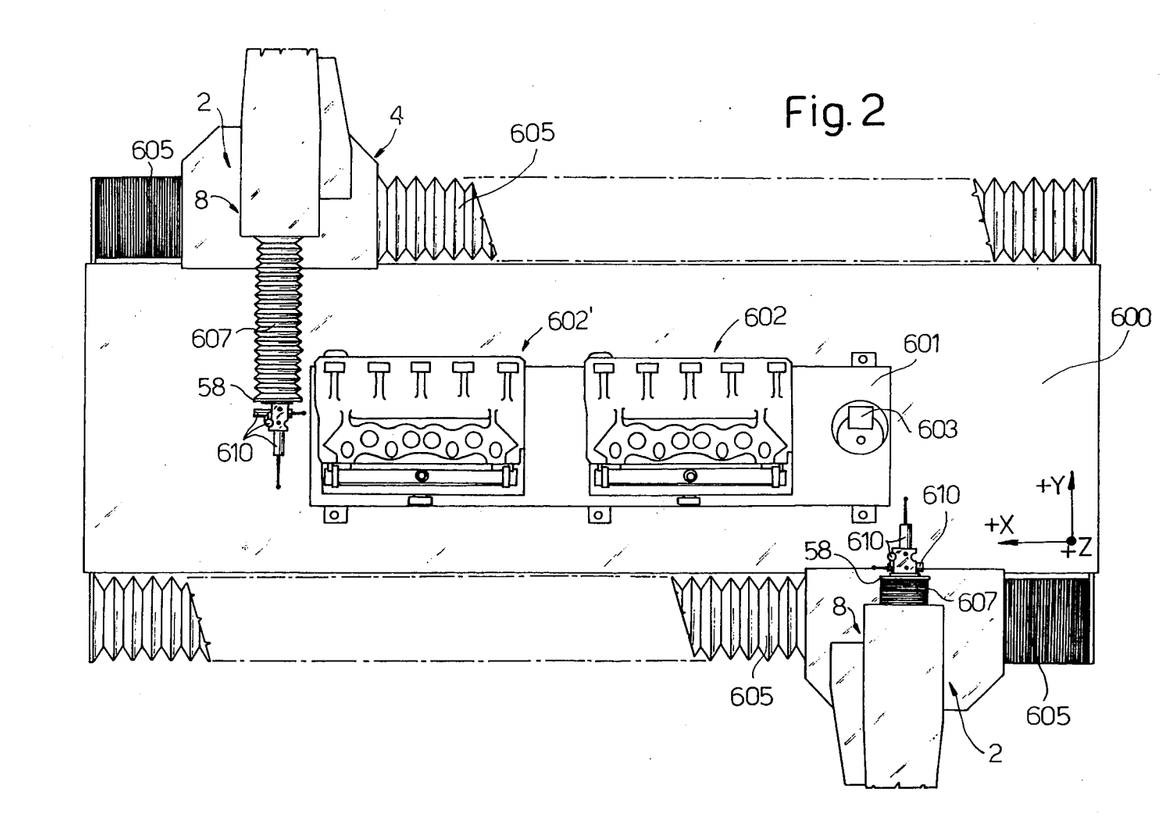
FIGS. 2 and 3 are, respectively, views from above and one side of a configuration of the measurement system of the present invention.
Figure 3:
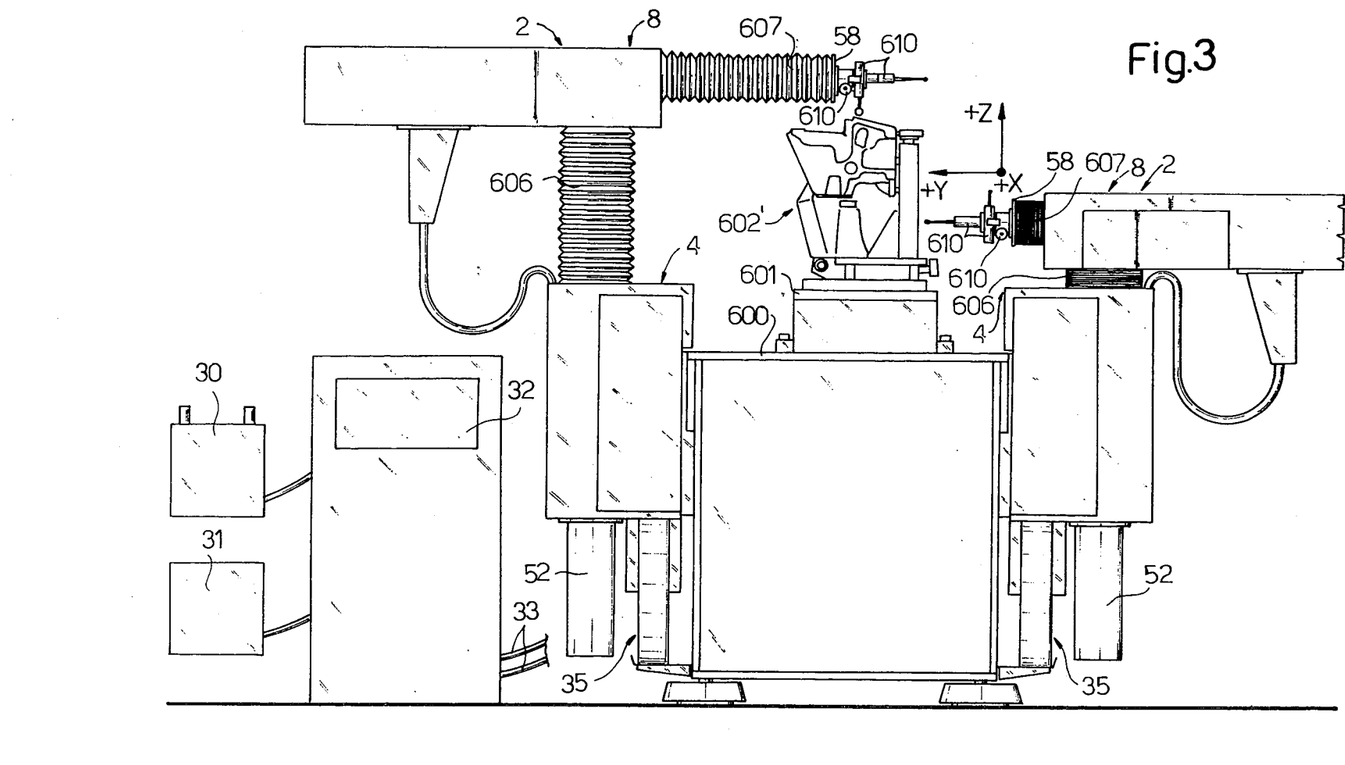

With reference to FIGS. 2 and 3 there is illustrated a mechanical arrangement of a measurement system formed according to the present invention, constructed as a measurement cell. This comprises a working bed 600 supporting a measurement plane 601 on which the workpieces to be measured can be positioned (in the case illustrated there are two blocks 602 and 602' or cylinder heads of an internal combustion engine). On the plane 601 there is fixed a body 603 of known type, (conveniently a cube) for initial measurement reference. On the two major sides of the work bed 600 there are fixed two support elements similar to the elements 6 of FIG. 1 along which slides an associated arm 2. In particular, between the ends of the carriage 4 and the ends of the support element there are secured two bellows 605 which cover the support element itself. Between the carriage 4 and the carriage 8 there is fixed a bellows 606 which covers the column 5, and between the carriage 8 and the front flange 58 there is fixed a bellows 607 which covers the column 9. The head 3 of each arm 2 carries three known tracer probes 610 of point-to-point type which can emit a signal when their ends depart from an equilibrium position due to contact with a surface. In particular, for the right hand arm 2, the three tracer probes 610 are mounted with their ends directed respectively along the +y, +x and +z axes, while for the left hand arm 2 the three tracer probes 610 are mounted with their ends directed respectively along the −y, −x and −z axes. The computer system 1 simultaneously controls and monitors both arms 2.

Figure 4:
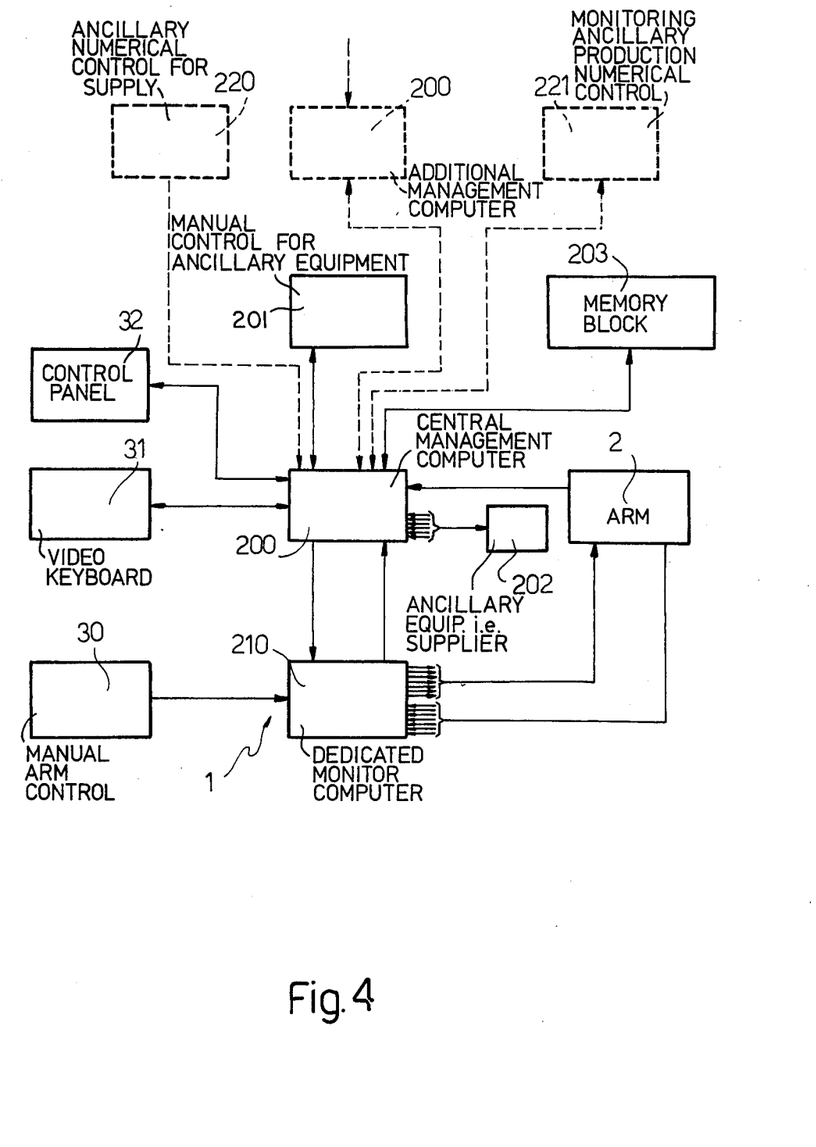
FIG. 4 is a block schematic diagram of the computer control system of the measurement system of the present invention.

With reference to FIG. 4, the computer system 1 for controlling the overall system includes a first central management computer 200 for providing dialogue with the arms via the control panel 32, the video keyboard 31, and a block 201 for the manual control of ancillary equipment 202 (for example operating stations or devices for supplying the cylinder blocks 602 onto the measurement frame 601), for the interpretation of the applied programs with the connection of a memory block 203, for the management of the external equipment 202 by means of input and output members, for the reception of information from sensors on the arm 2 and for general supervision, and a second dedicated computer 210 for the control and monitoring of the movements along each individual linear and rotary axis of the arm 2 (with a liimit of 12 axes) under the supervision of the central computer 200 by means of on-line connection with this latter. The box 30 for the manual control of the arm 2 is therefore connected to the computer 210. A central computer 200 includes a microprocessor, for example of the LSI 11 type and the computer 210 comprises a microprocessor for example of the INTEL 8080 type.

The control panel 32 includes three distinct sections:

(a) a "power" section with a push button with integral warning lamp for starting the computer system 1, a push button for stopping the system and an emergency push button for disabling the system while leaving it turned on;

(b) a "cycle" section with push buttons for starting and stopping the measurement cycle, for continuing the cycle step by step, for stopping the arm 2 after completion of a measurement cycle, and for zeroing the position of the arm;

(c) a "selectors" section for executing movements under computer control, for manual movement of the arm 2 with the box 30, and for changing the working speed of the arm 2.

The box 30 includes the following main elements:
a lever for the movement of the arm 2 along the x and y axes;
a lever for the movement of the arm 2 along the z axis and around the available rotations ($R_1$, $R_2$, $R_3$) according to the position of a three-position rotary selector;
a push button for data acquisition, this push button having an incorporated warning lamp;
an acoustic indicator;
a three-position rotary selector switch which, in the left hand position, turned in a counterclockwise direction, enables the movement along the z axis; in a central position enables the first rotation, and in the right hand position enables the second rotation.

If a large number of arms 2 are used it is possible to have different units each controlled by a respective central computer 200, which communicate with one another by means of the respective computers 200 (FIG. 4). The central computer 200 can then also be connected to systems 200 for numerical control of the management of operating machines or for supply of the workpieces etc., and can also be connected to a computer system 221 which controls a production process of the workpieces which are to be measured, thereby being able to influence the production process itself by correcting tendencies to dimensional errors by being able to exert a direct quality control on the manufacturing process itself.

With reference to FIGS. 2 and 3, the measurement system illustrated works in the following way: a device (not illustrated) positions and clamps the two engine blocks 602 and 602' on the measurement plane 601. The two arms 2 operate simultaneously on each engine block 602 and 602' so that it can be gauged in each direction (+x, −x, +y, −y, +z, −z) with the probes 610. Having completed, for example, the measurement on the engine block 602, the two arms 2 move on to the engine block 602' effecting complete measurement of the engine block. When the measurement of the second engine block 602' has been completed, the two arms 2 automatically retract to the end of their stroke so that removal of the measured workpieces can be undertaken and new workpieces loaded onto the measurement plane 601. The measurements of the two arms 2 are coordinated, having been referred to the reference body 603.

Figure 5:
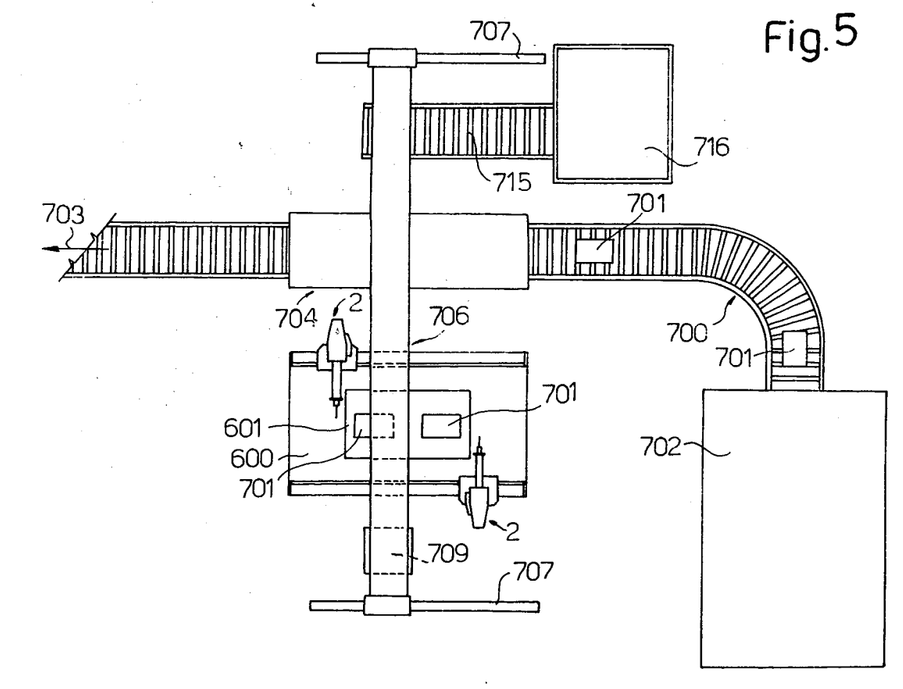
FIG. 5 is a schematic view of a measurement system formed according to the present invention and applied to a production line.

In FIG. 5 there is illustrated a further example of measurement system formed according to the present invention. A roller conveyor 700 carries a plurality of workpieces 701 from a machining zone 702 towards an assembly zone 703. The conveyor 700 passes through apparatus 704 (conveniently having driven rollers and deflection channels) for isolating, for example, every fifth workpiece 701 for testing. The isolated workpiece 701 is picked up by a carrier device 706 which slides on guides 707 and which has a gripper member 709 for picking up the workpiece 701 and for depositing it onto the measurement plane 601. The computer system 1 controls the two arms 2 to perform the dimensional measurement and then evaluates if the detected tolerances are acceptable or not. If positive the workpiece 701 is carried back by the device 706 onto the conveyor 700 to continue towards the region 703; if negative the workpiece 701 is, on the other hand, carried on a conveyor 715 towards a region 716 for collection of reject workpieces.

The entire operation described is controlled by the computer system 1 and due to the presence of the two arms 2 which operate simultaneously there is a drastic reduction in the measurement time which can be of the order of a minute so that the measurement system can be combined with a production line producing several hundreds of workpieces per hour (with statistical dimensional measurement since, as mentioned, the computer system 1 can also act on the production process for the prevention of rejects).

The configurations of the measurement system formed according to the present invention can be significantly different from one another both as far as the number and the arrangement of arms is concerned, and as far as the individual arms are concerned, by the presence or absence of axes of rotation and by the number and type of sensors used and by all the external devices necessary for supplying and orientating workpieces to be measured. The computer system 1 can effect the mechanical movements of the arms, administer the sensors and the external devices (tooling etc.,) and therefore cope with all the requirements of complex applications. The required productivity for a given application, the type and number of devices necessary for supply and orientation of the components, the requirements for connection with the surrounding production environment all have a bearing on the determination of the number of arms 2 necessary and on their positioning around the measurement bed.

The measurement system, characterised by simultaneous measurement with different arms, and by constructional modularity, both at the arm level (number of axes) and at the overall level (number of arms used, type and number of sensors, degree of integration with other machines and devices) and flexibility of use, is conveniently used in the field of measurement of mechanical components. The system can interfere with special purpose automatic tooling for supply and orientation of components, with measurement and testing instruments, with tools dedicated to technological operations to be performed on individual components or on assembled units. The computer system 1 is reprogrammable and can memorize different cycles both at the level of a single arm 2 and for the overall system.

To increase the number of inputs and outputs of the measurement system the following three types of modules are available: sensor interface, input for tooling, output for tooling. These can be connected with the central computer 200 in various combinations up to a maximum of eight, with not more than two modules committed to sensors.

With the system of the present invention there is therefore the advantage of having available a dimensional measurement system which is extremely adaptable to very different conditions of application.

As far as the program is concerned, this may cause simultaneous movements on the linear and rotary axes of the various arms 2, with controlled acceleration and deceleration. The program for the system allows several functions to be performed in parallel. The programmer separates the complete cycle into parts (cycle of the individual arms 2, the cycle of the individual automatic tools integrated into the system, etc.,) which are performed almost in parallel. The data necessary for the program used are usually provided by a self-teaching phase. In this way the coordinates of the significant points (pick-up points and depositing points) are learned; the program used is stored in the core memory 203 and is automatically transferred to the computer memory 200 upon switching on. During operation the microprocessors 200 and 210 perform a functional monitoring of all of the processing members for self diagnosis, stopping the movement of the arms on the occurrence of any breakage.

The measurement system of the present invention can thus advantageously be used even in combination with medium and large production lines in that the measurement of the workpieces is effected in real time thanks to the utilization of different simultaneously operating arms 2 which because of their particular light and precise support structure can achieve notably high velocities and accelerations with respect to other measurement devices while still obtaining high precision.

The speed of displacement of each arm 2 along the support element 6 is up to 40 m/minute. The maximum acceleration is 1/5 g; the maximum pick-up point frequency is five hertz with point-to-point tracers, and one hundred hertz with continuous tracers.

The support structure of the arm 2 can be differently orientated, but always according to the three cartesian axes x, y, and z. On the head 3, instead of the point-to-point type probes 610 there can be mounted dimensional measurement probes of the continuous type, or dimensional measurement devices of the sensitive pincer type (detecting displacement between the jaws).

The arm 2, with respect to the structure described in the said Patent Application can have various modifications and variations, for example the carriage could slide on compressed air bearings rather than on rollers, and the position transducers along the x, y, and z axes could be obtained using optical rules etc.

Finally, it is clear that the described and illustrated embodiments of the system of the present invention can be modified and varied without, by this, departing from the scope of the invention itself. For example the functions of the two computers 200 and 210 could be performed by a single computer.

We claim:

1. A dimensional measurement system for measuring a workpiece at a workpiece station comprising:

at least two operating arms, means for mounting said arms on opposite sides of the workstation;

first means carried at an end of one operating arm for detecting dimensional measurements along three orthogonal coordinates of the workpiece and second means carried at an end of the other arm for detecting dimensional measurements along the opposite three orthogonal coordinates of the workpiece, means for displacing each said arm in three orthogonal directions with respect to said workpiece station so that said detecting means on said arms simultaneously measure the workpiece in opposite orthogonal directions, and computer means for controlling and monitoring displacement of each said arm and each said detecting means.

2. The invention as defined in claim 1 wherein each said displacing means comprises;

a carriage, means for slidably securing and linearly displacing said carriage adjacent the workpiece station in a first orthogonal direction, a first beam, means for slidably mounting said beam to said carriage along a second orthogonal direction.

3. The invention as defined in claim 2 and comprising a second carriage secured at a top end of said first beam, a second beam, and means for slidably mounting said second beam to said second carriage along a third orthogonal direction.

4. The invention as defined in claim 1 wherein said displacing means comprises linear guide elements and electric motors.

5. The invention as defined in claim 1 wherein said first and second detecting means each comprises a tracer probe.

* * * * *

UNITED STATES PATENT AND TRADEMARK OFFICE
CERTIFICATE OF CORRECTION

PATENT NO. : 4,484,293
DATED : November 20, 1984
INVENTOR(S) : Giorgio Minucciani et al It is certified that error appears in the above-identified patent and that said Letters Patent is hereby corrected as shown below:

Column 4, line 48 delete "200" insert --220--.

Column 5, line 63 delete "interfere" insert --interface--.

Signed and Sealed this

Sixth Day of August 1985

[SEAL]

Attest:

DONALD J. QUIGG

Attesting Officer

Acting Commissioner of Patents and Trademarks